US010505465B2

(12) United States Patent
Gougerchian

(10) Patent No.: US 10,505,465 B2
(45) Date of Patent: *Dec. 10, 2019

(54) SYSTEM AND METHOD OF IMPLEMENTING AN ELECTRONIC BRUSHLESS VARIABLE TRANSFORMER FOR PROVIDING A VARIABLE AC OUTPUT

(71) Applicant: Abbie Gougerchian, Commerce, CA (US)

(72) Inventor: Abbie Gougerchian, Commerce, CA (US)

(73) Assignee: CMS, INC, Palos Verdes Estates, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,238

(22) Filed: Jul. 31, 2017

(65) Prior Publication Data

US 2017/0331387 A1     Nov. 16, 2017

Related U.S. Application Data

(63) Continuation-in-part of application No. 14/295,708, filed on Jun. 4, 2014, now Pat. No. 9,722,501.

(60) Provisional application No. 61/831,068, filed on Jun. 4, 2013.

(51) Int. Cl.
*H02M 5/10* (2006.01)
*H01F 21/04* (2006.01)
*H01F 27/33* (2006.01)
*H02M 5/257* (2006.01)
*H02M 1/00* (2006.01)

(52) U.S. Cl.
CPC .............. *H02M 5/10* (2013.01); *H01F 21/04* (2013.01); *H01F 27/33* (2013.01); *H02M 5/257* (2013.01); *H02M 2001/0093* (2013.01)

(58) Field of Classification Search
CPC ...................................................... H02M 5/10
See application file for complete search history.

(56) References Cited

U.S. PATENT DOCUMENTS

| 5,563,775 A * | 10/1996 | Kammiller | ............ H02M 3/335 |
| | | | 363/132 |
| 8,035,358 B2 * | 10/2011 | Watt | ........................ H02M 5/10 |
| | | | 323/262 |
| 9,325,374 B2 * | 4/2016 | Magin | ...................... H04B 3/54 |

* cited by examiner

*Primary Examiner* — Jue Zhang
*Assistant Examiner* — Trinh Q Dang
(74) *Attorney, Agent, or Firm* — Paul B. Heynssens Attorney at Law, PLC

(57) ABSTRACT

An electronic brushless variable transformer. Variable autotransformers, use brushes, and as such, have moving parts requiring maintenance and periodic cleaning of the brushes. A variable transformer without brushes is advantageous in that it eliminates the cleaning and maintenance of brushes.

5 Claims, 17 Drawing Sheets

VIN > Set Tolerance

VIN < Set Tolerance

SYSTEM AND METHOD OF IMPLEMENTING AN ELECTRONIC BRUSHLESS VARIABLE TRANSFORMER FOR PROVIDING A VARIABLE AC OUTPUT

CROSS-REFERENCE TO RELATED APPLICATION

This application claims the benefit of U.S. Provisional Patent Application No. 61/831,068 filed Jun. 4, 2013, the contents of which are hereby incorporated by reference. This application is also a continuation-in-part of application Ser. No. 14/295,708, filed Jun. 4, 2104 and now issuing as U.S. Pat. No. 9,722,501, the disclosure of which is incorporated herein by reference.

TECHNICAL FIELD

This description relates generally to electronic transformers and more specifically to brushless variable transformers.

BACKGROUND

An electronic transformer is an AC electronic component that will change, or transform an AC input voltage to a different output voltage level. An important characteristic of typical transformers is that circuitry connected to the primary is electrically isolated from circuitry connected to the secondary winding. An output voltage higher than the input voltage will generate a lower output current, and a lower output voltage will generate a higher output current. After accounting for losses in the transformer the power into the transformer is substantially equal to the output power produced. A transformer may have a first, primary winding upon a core, with a second winding, or secondary, also disposed upon the same core. The primary core to which an input voltage is applied, through electromagnetic coupling induces a voltage across the secondary. Accordingly the output voltage of a transformer may be changed by adding or removing secondary turns Alternatively, discrete voltages may be selected by attaching wires (taps) at various taps. The taps if connected to a rotary switch provide discrete, but variable output voltages.

In an alternative construction a more continuous output voltage may be produced by allowing a conductor (typically a carbon brush), to slide over exposed turns of a secondary winding. Typically, a knob is provided, and turning it in one direction increases the voltage output, and the opposite direction decreases the output voltage.

Transformers of this sort may be desirable in applications which require a variable voltage, such as light dimmers, welders, motor controls, audio applications, testing equipment at low and high end operating conditions, and the like. However, using a conventional transformer with a bulky core and two windings in such applications would not be practical. If electrical isolation is not needed a device called an autotransformer may be substituted for a transformer. It advantageously utilizes a single winding in which taps or brushes may be applied as previously described in a transformer.

FIG. 1. shows a schematic of an autotransformer 100, which has a single winding 102 over a core material 104 with two primary terminals 106 and 108 at the extreme ends of that single, or primary winding. It also has one or more terminals or taps 110 at intermediate tap points along the single winding 102 that forms the secondary winding or circuit. Thus the primary and secondary coils have part or all of their turns in common.

The primary voltage 112 is applied across two of the primary terminals, and the secondary voltage 114 taken from the tap terminals. The autotransformer almost always has one terminal 108, in common with the primary voltage. The primary and secondary circuits, therefore, have a number of windings turns in common. Since the volts-per-turn is the same in both windings, each develops a voltage in proportion to its number of turns. In an autotransformer, part of the current flows directly from the input to the output, and only part of the current is transferred by induction.

Autotransformers may also include many taps and include additional automatic switchgear to allow them to act as automatic voltage regulators to maintain a steady voltage over a wide range of load conditions. If a sliding tap is used that contacts more than one turn at a time, the turns are shorted. However if a resistance is inserted sliding tap the shorting problem may be eliminated. An autotransformer that is designed to produce continuous voltage variation, without shorting adjacent turns is known as a variable autotransformer, such as the VARIAC® variable autotransformer from Instrument Service and Equipment, Inc., Cleveland, Ohio.

FIG. 2 shows an electrical schematic of a variable autotransformer. In a variable autotransformer, part of the winding coils 202 may be exposed and the secondary connection is made with a sliding brush 204. The brush is typically a carbon brush. The primary connection is 206. The addition of the brush, which may be controlled with an external knob (not shown) allows a continuously variable turns ratio to be obtained, which is established by the location in the winding the brush makes contact. This allows for very smooth control of voltage. The output voltage 208 is not limited to the discrete voltages represented by actual number of turns. The input voltage 210 can be smoothly varied between turns as the brush has a relatively high resistance (compared with a metal contact) and the actual output voltage is a function of the relative area of brush in contact with adjacent windings. The primary connection 206 can be connected to only a part of the winding allowing the output voltage to be varied smoothly from zero to above the input voltage. This allows a variable autotransformer to be used for testing electrical equipment at the limits of its specified voltage range.

Brushes make physical and electrical contact in conducting electricity between moving parts and tend to wear from use. Typical applications of brushes include electric motors, alternators, electric generators, and variable autotransformers. Accordingly it would be desirable to eliminate the use of brushes in a variable transformer design.

The voltage sensed by the switches 310, 312, 314, 316 is before the corrected output by T1 This ensures that the input to T1 is monitored and 310, 312, 314, 316 change to get desired voltage at the output of T1

Such commercially available devices for having variable voltages are typically constructed with transformer and moving brush. The brush is moved on the coil of the transformer to obtain variable AC voltage. The transformer with 2 phases has 2 brushes and transformer with 3 phases has 3 brushes moving simultaneously, manually or operated by motor. These devices are typically referred to as "Variac" or "Variable Transformer".

A disadvantage of this system of variable AC voltage is that the brushes are made of Carbon and they wear out. The mechanical moving parts and the brushes need regular maintenance. The motor operated Variacs have gears, limit switches etc. that also need regular maintenance. Moving brushes create arcing. Therefore, this cannot be used in hazardous locations.

Those having skill in the art would understand the desirability of having a variable transformer that uses circuitry to vary and regulate output voltage without brushes. The variable transformer described herein allows the use of a variable transformer not requiring cleaning and maintenance of moving parts, nor mechanical brushes.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an electronic brushless variable transformer using electronic switches and a unique circuitry to provide a variable voltage output. An electronic variable transformer without brushes is advantageous in that it eliminates arcing, the cleaning and maintenance of brushes.

The Electronic version of a VARIAC® (electronic brushless variable transformer) described herein does not need the brushes, mechanical movement or a motor to produce a variable AC output. The Electronic VARIAC® can also be described as a "electronic brushless variable transformer", "Solid State VARIAC®" or "Solid State Transformer" and they can be built for single, double or three phase operations. A buck/boost technique nay be applied to eliminate use of the moving parts in commercially available single, double and three phase Variacs used in low and high voltage applications. The electronic Variac can also be used to stabilize or regulate the output voltage.

The human interface for the Electronic VARIAC® can be a simple potentiometer (for manual adjustment), digital switch or a touch screen or a tablet or iPhone, or the like (for remote adjustment). Many devices are being added to "IOT" (Internet Of Things) devices. If the Electronic Variac is installed in the hazardous zone, the remote control is the only option for setting. The remote access also helps to check the status of the output.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples of a brushless variable transformer and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a brushless variable transformer. As those skilled in the art will appreciate, the present examples are suitable for application in a variety of different types of voltage control and regulation systems.

Figure 1:
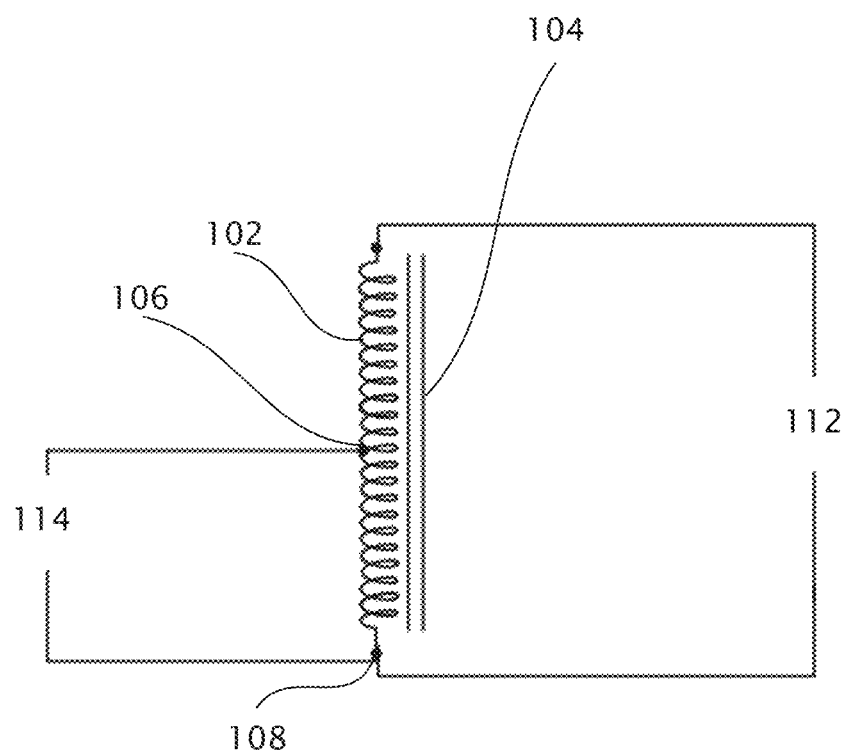
FIG. 1 shows an electrical schematic of an autotransformer.

FIG. 1 shows an electrical schematic of an autotransformer 100. In this AC circuit a secondary voltage 114 less than the input voltage 112 is generated from a tap point 106 at a point in the winding 102, which may include a ferromagnetic material 104 as a core. Such a device typically provides a fixed AC output voltage as the tap point 106 is typically a hard wired connection.

Figure 2:
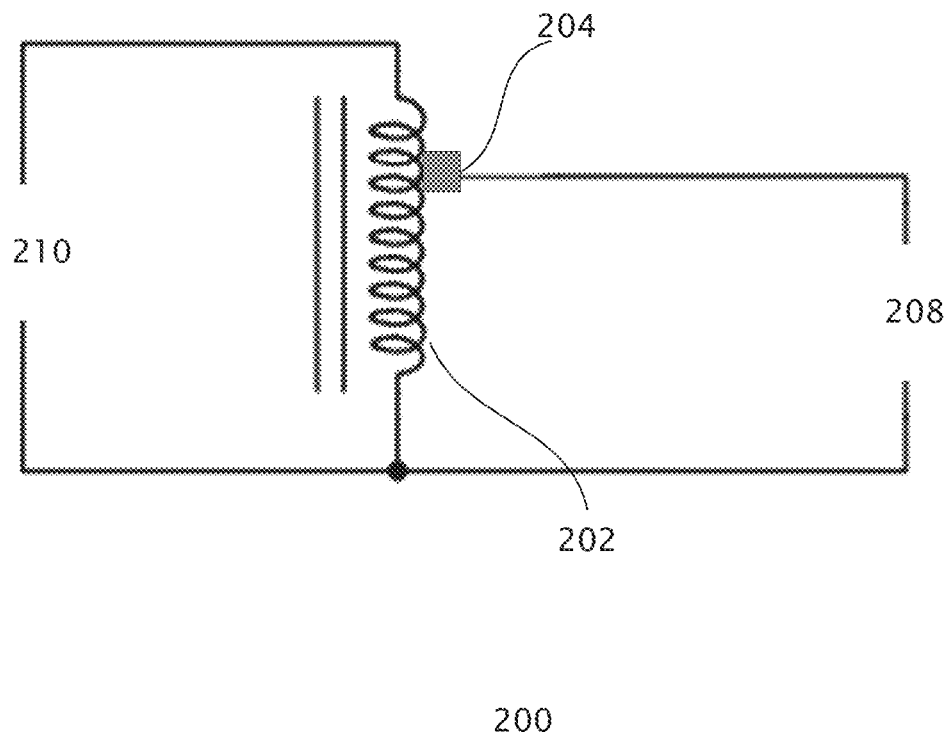
FIG. 2 shows an electrical schematic of a variable autotransformer having carbon brushes contacting a winding.

FIG. 2 shows an electrical schematic of a variable autotransformer with carbon (or equivalent) brushes contacting a winding 200. Here an output voltage 208 may be varied to a value less than that of the AC input 210 by the mechanically positioning of a typically carbon brush 204 along an exposed portion of a winding 202. Here the brush, or brushes, are mechanically moved along contact points along the winding 201 to generate a lesser desired output voltage 208. Brushes tend to wear and as a result are a maintenance item. Also, intricate mechanical couplings typically have to be provided to move the brushes along the winding, which is another maintenance item.

Figure 3:
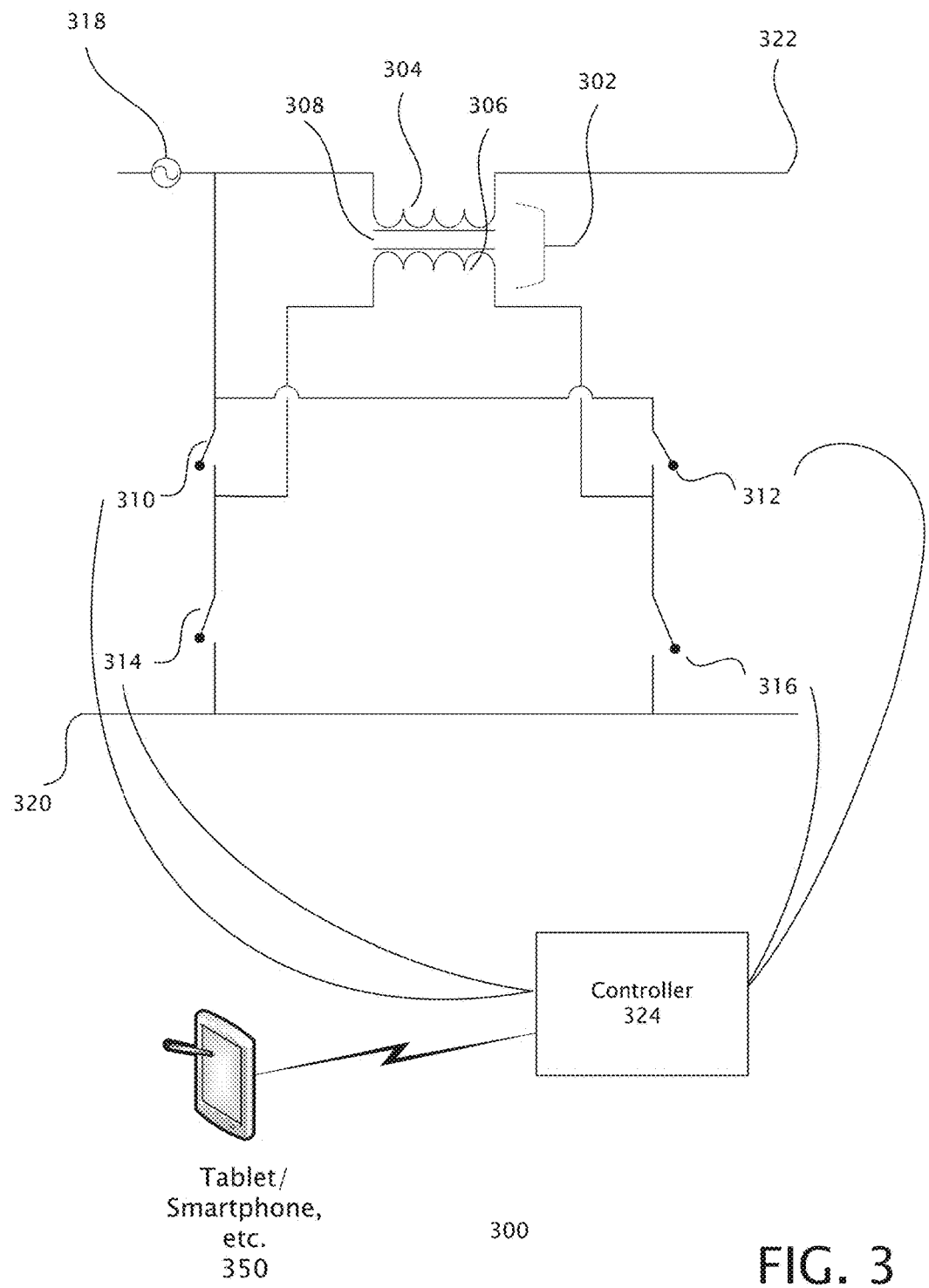
FIG. 3 shows an electrical schematic of a continuously variable autotransformer (electronic brushless variable transformer) utilizing switches rather than brushes.

FIG. 3 shows an electrical schematic of a unique brushless variable transformer (or equivalently an "Electronic Variac", "Binary Variable Transformer" or "Brushless Variac") 300 constructed as described herein. This circuit advantageously allows a variable AC voltage to be generated without the need for mechanical parts, couplings carbon brushes, or the like. Further the output voltage may be varied digitally, and remotely, either directly or through an intermediary controller 324. Typically a remote interface such as provided on a tablet or other mobile device may be utilized. The areas of application of devices are increasing. People are looking for "IOT" (Internet Of Things" devices. Having remote access to Electronic Variac would be required in future. The Electronic Varaic could be installed in hazardous environment, Variac with brushes cannot used due to arcing. In this environment Electronic Variac would be ideal choice and remote access would be preferred.

Importantly, as differing from the circuit of FIG. 2, here the voltage may be sensed by transformer at the source 308. The voltage sensed by switches 310, 312, 314 and 316 will remain same before and after a voltage correction implemented by switching. Importantly the circuit here in FIG. 3 includes switches that may be coupled on the input side of the transformer (next to source 318).

The voltage sensed by the switches 310, 312, 314, 316 is after the corrected output by T1. This would affect the voltage seen by 310, 312, 314, 316 change when they are switched.

For many years silicon controlled rectifiers ("SCRs") have been used for voltage regulation. The circuits described herein allow regulation without an SCR being in the line all the times, advantageously allowing circuit designers to work with higher voltage and more reliability, and further providing the ability to dial in, or set, a specific voltage. Finally the circuits tend to have a fast step response. The step response is typically 30 milli seconds.

A conventional transformer 302 has a primary winding 304 and a secondary winding 306 sharing a common core 308. Voltage is induced in the secondary winding 306 solely by inductive coupling to the primary winding 304. The transformer 302 is characterized by the ratio of the number of turns of the primary winding 304 around the common core 308 to the number of turns of the secondary winding 306 around the common core.

Power switches 310, 312, 314, and 316 are conventionally constructed switches, and may be of any suitable construction. These switches may be relays, contactors, or solid state power devices such as insulated gate bipolar transistors (IGBT) and silicon-controlled rectifiers (SCR), which are also known as thyristors. The switches are isolated from the line current, and operate at much lower voltage than line voltage. Alternating current (AC) at line voltage is provided at an input 318, and modified alternating current at variable voltage is at an output 322. The line voltage may be low, in the range of 200 to 400 VAC, or may be in a medium voltage range of 4600 to 13,600 VAC. The circuit is provided with a neutral connection 320. The Brushless Variac system includes a set of transformers and its associated switches and has one controlling element, which could be a microcontroller, a PLC, or equivalent.

Switches 310, 312, 314, and 316 are not operated at line voltage, and may be controlled using an intermediary controller such as microcontrollers and/or a programmable logic controllers (PLC) 324 using proportional-integral-derivative control (PID) and or a microcontroller, or the like. The construction and wiring of such controllers is well known and is not shown in FIG. 3 for simplification of the diagram. Online control of the PLC is also provided by controlling the PLC through a conventional computer network (not shown) coupled to the PLC, which may include tablet computers, notebook computers and the like configured as control panels.

The methods for implementing and controlling a brushless variable transformer as described herein are unique to the examples described below. Power switches 310, 312, 314, and 316 can be configured to allow or prevent current from passing through them, and subsequently alter the direction of current applied to the secondary winding of transformer 302, thereby making the output voltage buck or boost due to changes in the inductive voltage transfer from the secondary winding 306. The various switch configurations and subsequent variation in the output voltage are described in FIGS. 4-6.

Figure 4:
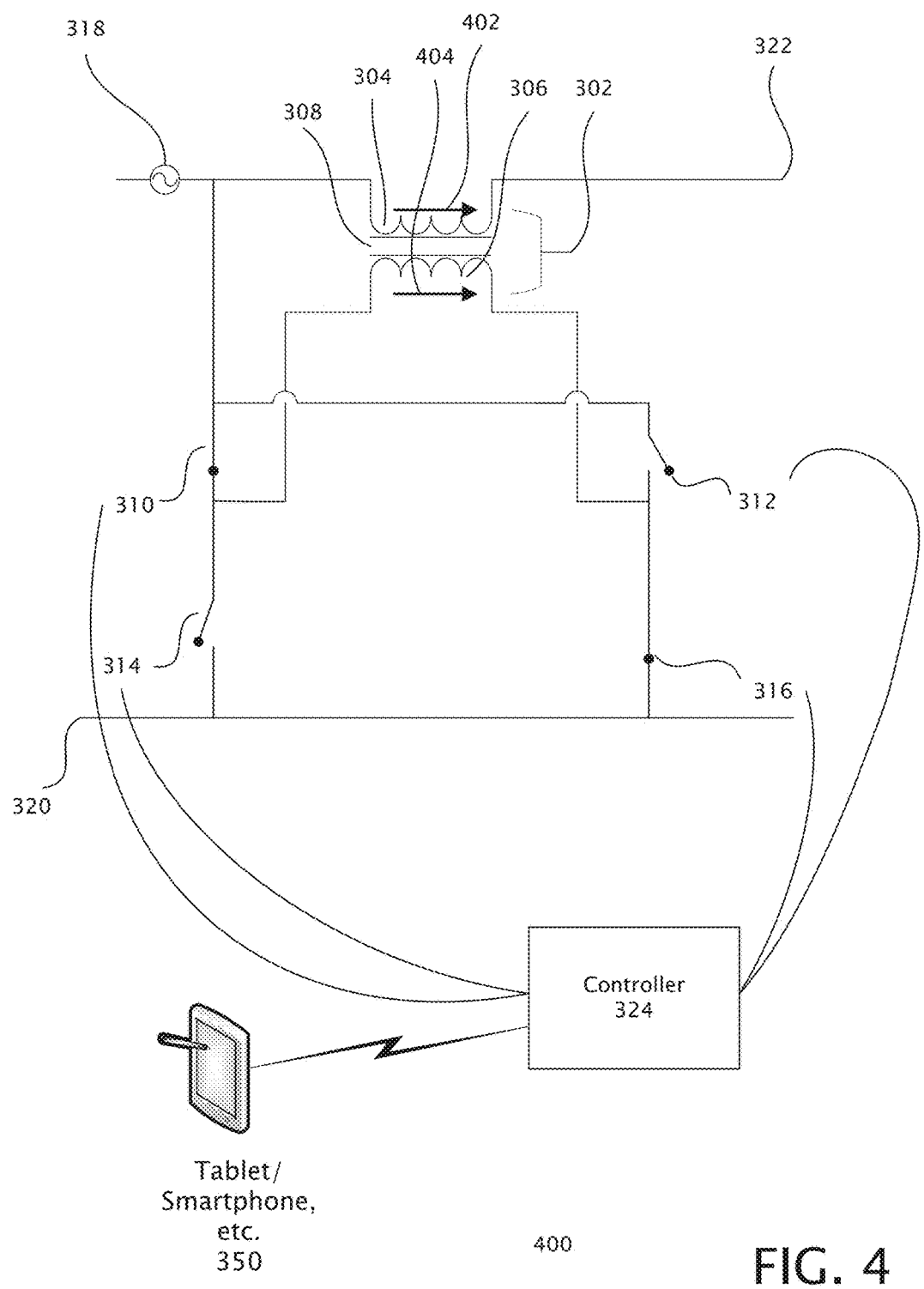
FIG. 4 shows an electrical schematic of the electronic brushless variable transformer with switches set in a first position wherein the switches are closed to create an increase in line voltage.

FIG. 4 shows an electrical schematic of a brushless variable transformer wherein the switches are opened or closed to create an increase in line voltage. The controller 324 directs the switches 310 and 316 to allow current to flow through them, and switches 314 and 316 not allow current to pass. Input alternating current 318 passes through the primary winding of transformer 302. Arrow 502 shows the direction of current flow. Simultaneously, the condition of switches 312 and 316 allow current from input 318 to pass through the secondary winding 306 of transformer 302 to neutral 320. Arrow 504 shows the direction of current flow in the secondary winding. The condition of switch 316 connects the circuit to the neutral 320.

Inductive coupling of the primary and secondary windings in this example provides for an increase in the voltage at the circuit output 406. The magnitude of the output depends on the ratio of the number of wire turns in the primary winding 304 to the number of wire turns in the secondary winding 306 in transformer 302. If, for example, when the secondary winding of transformer 402 is wound to produce 1% of the output, the output voltage 406 will equal the input voltage of the input current 318 plus 1%.

Figure 5:
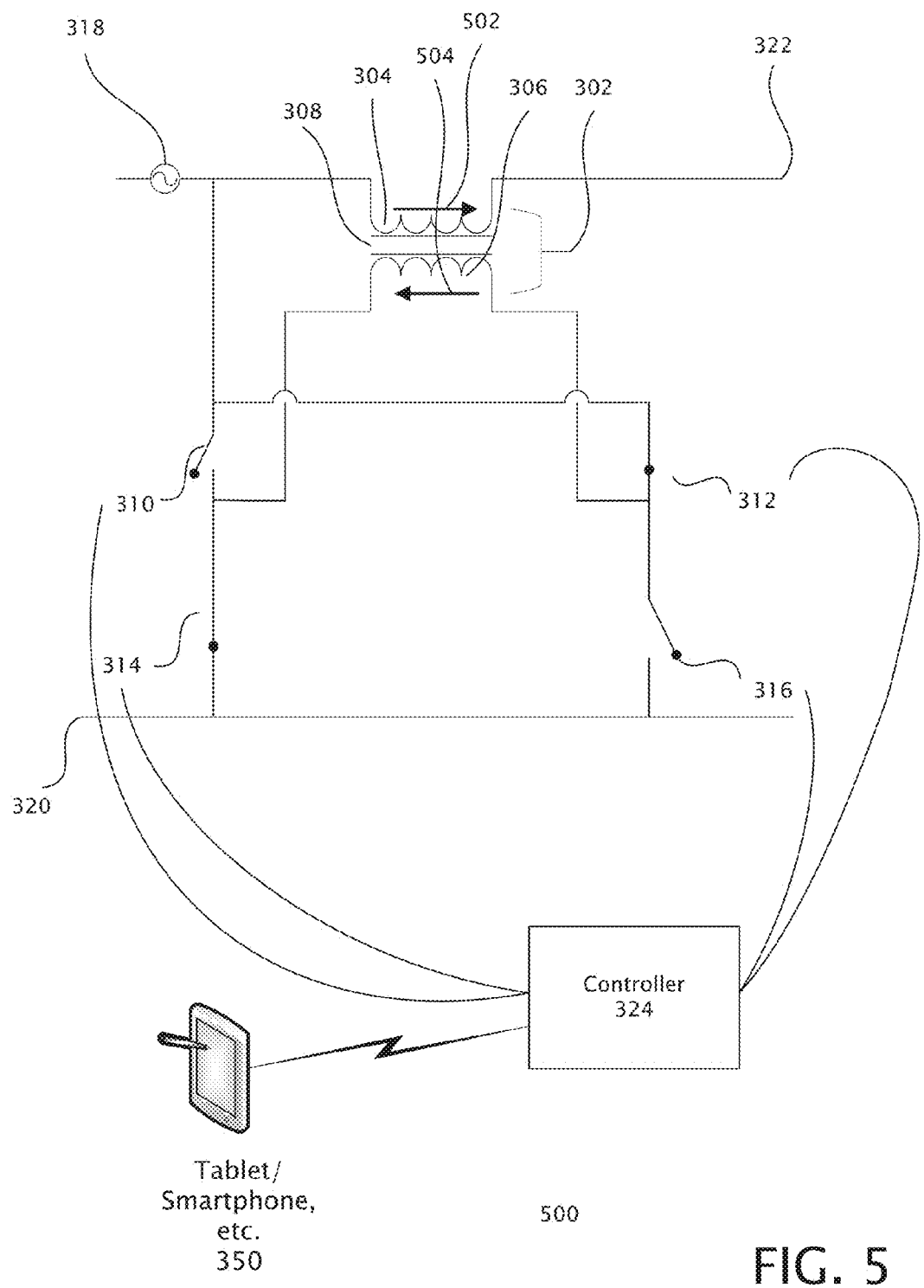
FIG. 5 shows an electrical schematic the electronic brushless variable transformer with switches set in a second position wherein the switches are closed to create a decrease in line voltage.

FIG. 5 shows an electrical schematic of the present invention wherein the switches are configured to create a decrease in line voltage. Here, the controller 324 activates switches 312 and 314 to allow current to flow through them, and switches 310 and 316 not to allow current to pass. Input alternating current 318 passes through the primary winding of transformer 302. Arrow 502 shows the direction of current flow. Simultaneously, the condition of switches 312 and 314 allow current from input 318 to pass through the secondary winding 306 of transformer 302 to neutral 320. Arrow 504 shows the direction of current flow in the secondary winding. The condition of switch 314 connects the circuit to the neutral 320.

Inductive coupling of the primary and secondary windings in this example provides for a decrease in the voltage at the circuit output 506. The magnitude of the output depends on the ratio of the number of wire turns in the primary winding 304 to the number of wire turns in the secondary winding 306 in transformer 302. If, for example, when the secondary winding of transformer 302 is wound to produce 1% of the output, the output voltage 506 will equal the input voltage of the input current 318 minus 1%.

Figure 6:
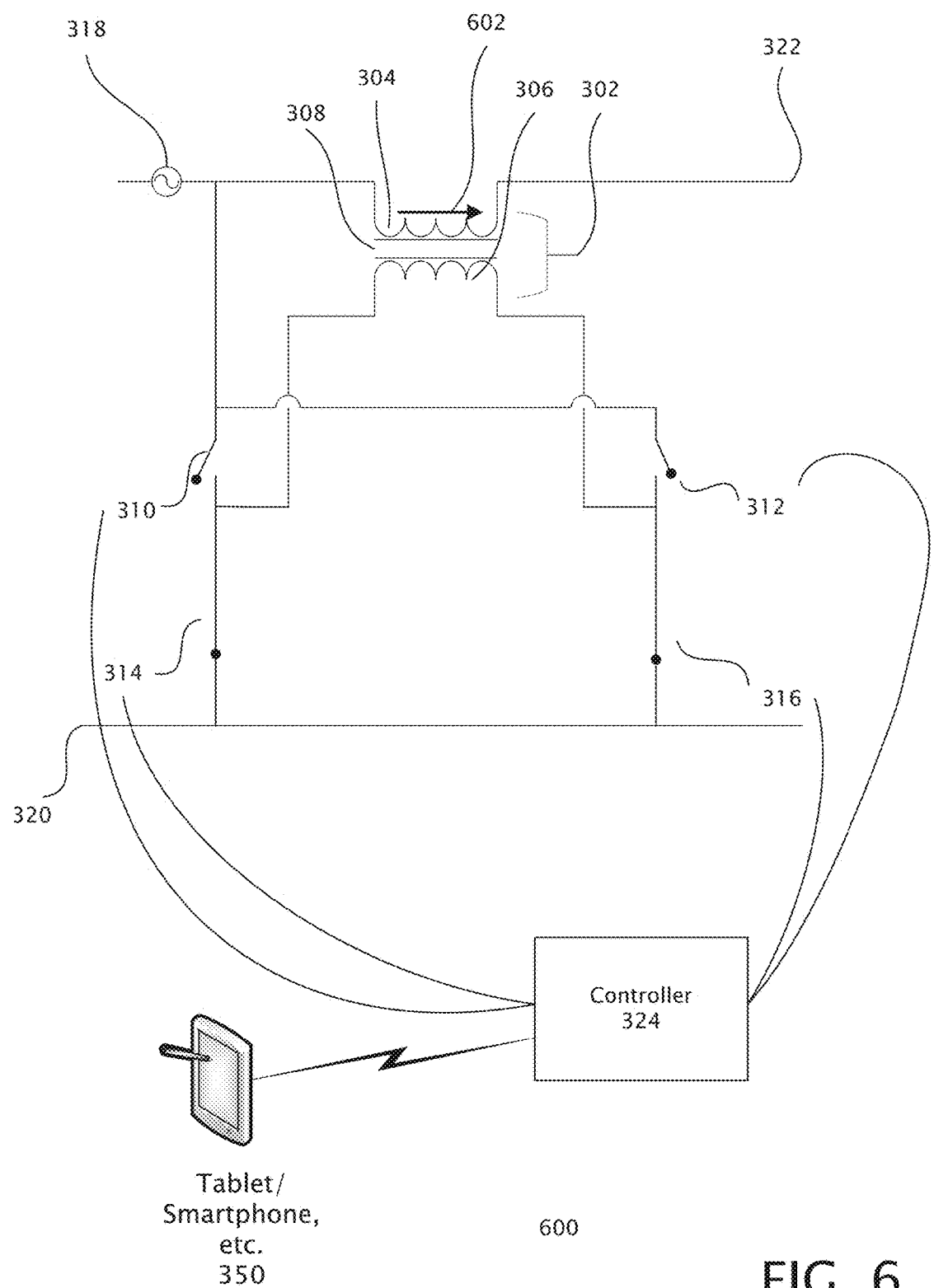
FIG. 6 shows an electrical schematic of the electronic brushless variable transformer with switches set in a third position wherein the output voltage equals the input voltage.

FIG. 6 shows an electrical schematic of the present invention wherein the output voltage equals the input voltage. Here, switches 314 and 316 are activated by the controller 324 to allow current to flow through them, and switches 310 and 312 do not allow current to pass. Input alternating current 318 passes through the primary winding of transformer 302. Arrow 602 shows the direction of current flow. Simultaneously, the condition of switches 310 and 412 do not allow current from input 318 to pass through the secondary winding 306 of transformer 302. As such, there is no current to provide inductive coupling to the current passing through the primary winding 602 and its voltage remains unchanged from the voltage of the input current 318.

Figure 7:
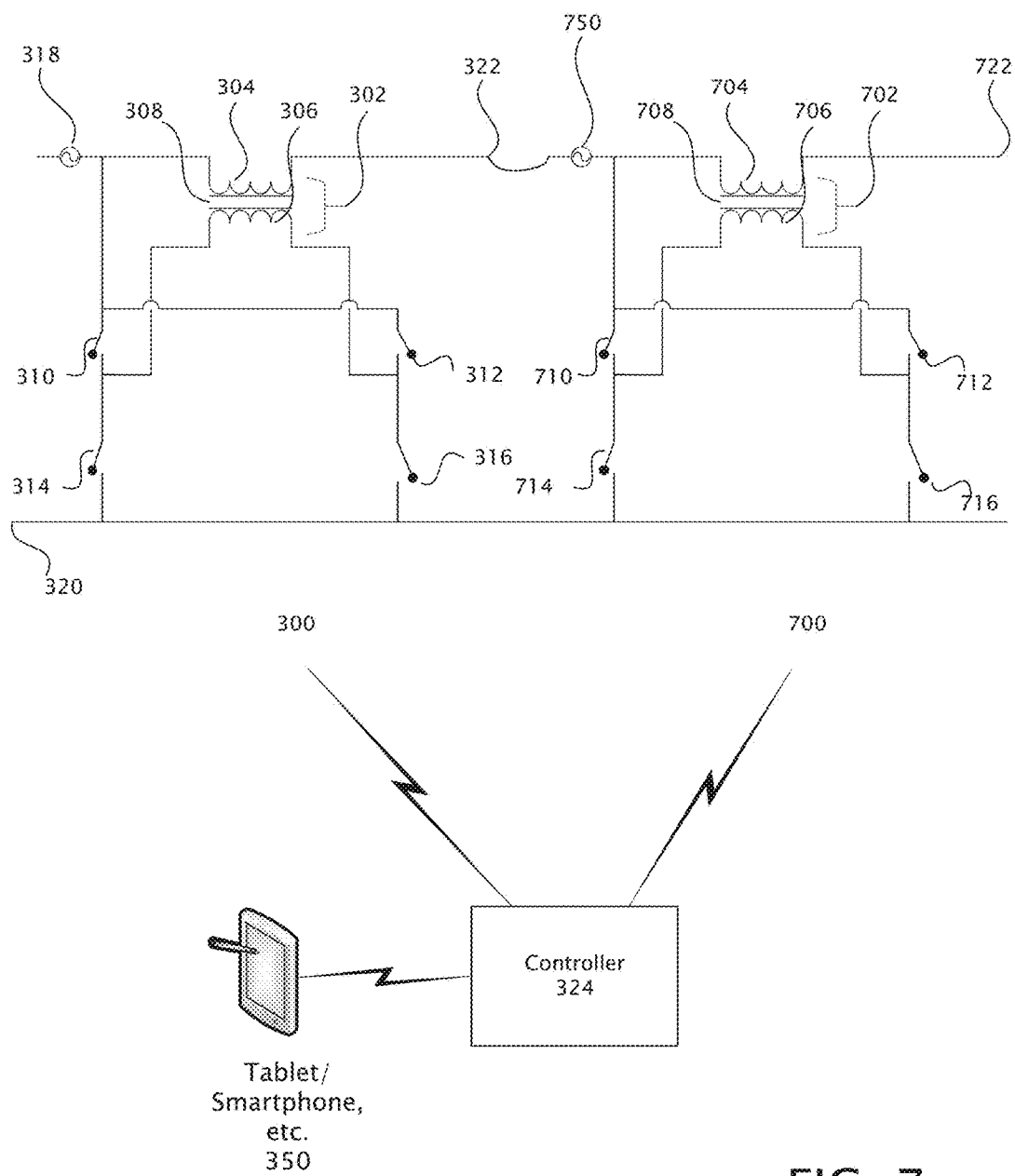
FIG. 7 shows an electrical schematic of multiples of the electronic brushless variable transformer used in series.

FIG. 7 shows an electrical schematic of multiples of present invention used in series. For simplification of the diagram, the controller for the switches is not shown. Although an exemplary pair of circuits 300 and 700 providing brushless variable transformers are shown, it is obvious to those skilled in the art that a plurality of such circuits can be connected in series to provide a wide range of possible voltage outputs. Each brushless variable transformer circuit can be provided with a different ratio of the number of wire turns in the primary windings to the number of turns in the secondary windings providing a wide range of possible outputs.

When multiple circuits shown above are coupled, or cascaded in series, the amount of buck (decrease in voltage) or boost (increase in voltage) can be controlled to get desired voltage at the output. In FIG. 7, two circuits 300 and 700 are coupled in series with different primary winding to secondary winding turns ratio transformers 302 and 702. The output current 322 from circuit 300 is the input current 750 to circuit 700.

If, for example, transformer 302 provides an exemplary 1% variation in the output current 322 voltage, there are three possible conditions transformer 302 can effect on the output current. These are +1%, −1%, and 0%. The +1% condition occurs when the switched in the circuit 300 are as shown in FIG. 4, −1% occurs when the switches in circuit 300 are as shown in FIG. 5, and 0% when in the switches are as shown in FIG. 6.

Similarly for circuit 700, if the ratio of the primary winding 706 turns to the secondary winding 708 are such that the transformer 704 provides an exemplary 3% variation, the three conditions circuit 700 can effect on the input current is +3%, −3%, and 0%. By linking the circuit 300 and circuit 700 in series such that the output current 322 is also the input current 750 to circuit 700, the voltage variation range is +/−4%.

By simultaneously activating with a controller, the switches 310, 312, 314, 316 and 710, 712, 714, 716 on the brushless variable transformer circuits 300 and 700 can be positioned to allow or not allow current to pass. An example of the possible voltage variations possible for this example is shown in FIG. 8.

Figure 8:
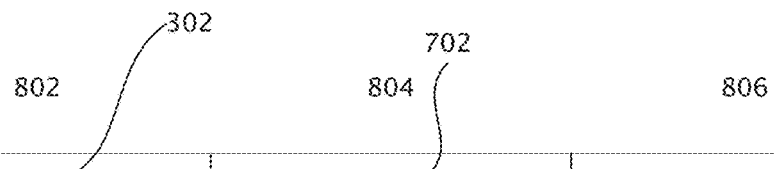
FIG. 8 shows a table with exemplary total voltage output variation for various switch configurations of the first example of an electronic brushless variable transformer.

FIG. 8 shows a table with exemplary total voltage output variation for various switch configurations for the exemplary variable transformers shown in FIG. 7. With two circuits with transformer 302 providing +/−1% of variation and transformer 704 providing a variation of +/−3%, it is possible to vary the output voltage of the cascade from −4% to +4%. Column 802 of FIG. 8 shows the possible effects on the input current voltage provided by circuit 300 in FIG. 7. Column 804 shows the possible effects on its input current voltage provided by circuit 700 in FIG. 7. Column 806 shows the total variation in voltage provided by the two circuit operating in series as shown in FIG. 7.

For the positive values in each of column 802 and 804, the switches are configured as shown in FIG. 4; for negative values, the switches are configured as shown in FIG. 5, and zero values occur when the switches are as shown in FIG. 6. By varying the switch positions systematically using the controller, total output variation in column 806 can be varied from +4 to −4%.

The examples provided above are but exemplary, and not limiting. The basic circuit may be varied in construction as long as a buck and boost may be applied to the output, causing a controlled variation without use of brushes. Alternatively the cascaded configurations and their ratios of primary winding turns to secondary winding turns may be adjusted to produce a variety of outputs.

For example, it is possible to couple more stages and get output variation of −31% to +31%, or −46% to +46%. If additional precision is required, additional stages of ½% or ¼% could be added. Similar stages may be constructed for use in three phase input/output needs.

Figure 9:
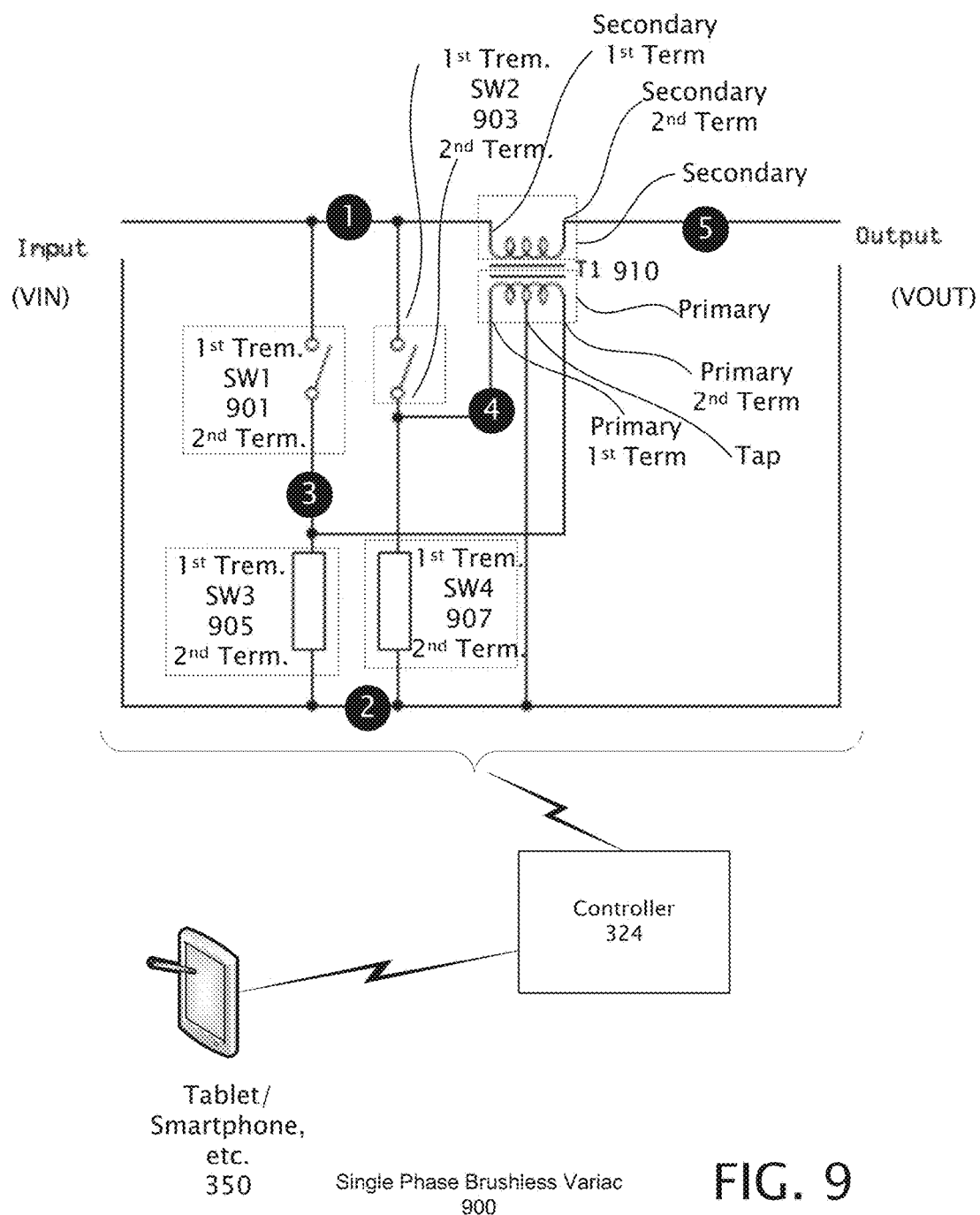
FIG. 9 shows a second example of an electronic brushless variable transformer.

FIGS. 9 and 10 show a second example of an electronic Variac with various conditions of switches SW1 through SW4. The reference designations utilized in FIG. 9 are also applicable to FIGS. 10A-10 10D which show the switches in various open or closed states to achieve the desired output voltages of FIG. 11. Circuit nodes are numbered 1-5 in the solid black circles. The input is applied across nodes 1 and 2, and the output is taken across nodes 5 and 2. A first terminal of SW 1 is coupled to node 2, as is a first terminal of SW 2, and a secondary first terminal of T1. A second terminal of SW1 is coupled to node 3 as is a first terminal of SW 3, and a first terminal of the primary of T1. A second terminal of SW 2 is coupled to node 4, as is a first terminal of SW 4. A tap on the primary of T1 is coupled to node 2 as is a second terminal of SW 4 and a second terminal of SW 3. A second terminal of the secondary winding of T1 is coupled to node 5. As is known to those skilled in the art a conventional controller 324 is coupled to SW 1-SW 4 to control their operation (open or closed), and configured to measure voltages and other circuit states in the circuit so that the output voltage may be set or otherwise controlled. Controller 324 may be provided with a wired, or wireless link to a remote device such as a tablet, smartphone or the equivalent 350 to control the circuit 900, and to read the circuit state including the output voltage. Switching devices SW 1-SW 4 are conventionally constructed and may be electronic, mechanical, electro-mechanical devices, or equivalent. Transformer T1 is conventionally constructed and may include a core. Transformer T1 may include a primary winding having a first and second terminal and a tap, Transformer T1 may also include a secondary winding having a first and a second terminal.

FIG. 10A-10D show exemplary total voltage output variation for various switch configurations for the second example of an electronic brushless variable transformer.

Figure 10A:
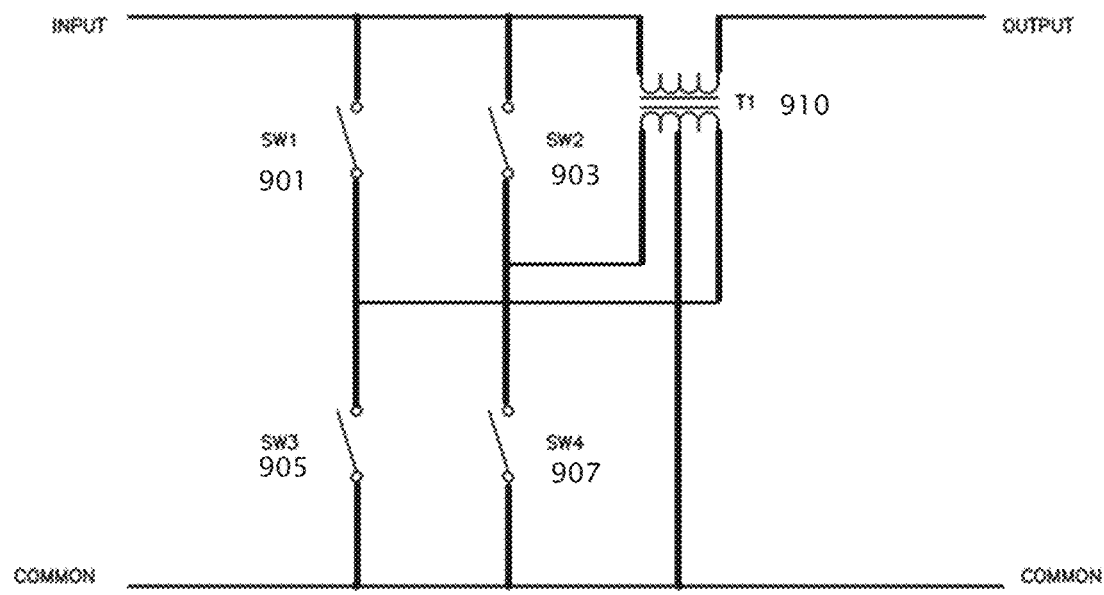
FIG. 10A-10D show exemplary total voltage output variation for various switch configurations for the second example of an electronic brushless variable transformer.

In FIGS. 9 and 10A-D the T1 primary has center tap. The controller 324 measures the input voltage. In FIG. 10A SW 1-SW 4 are off (Off=open, and ON=closed as used herein) causing the output voltage to equal the input voltage.

Figure 10B:
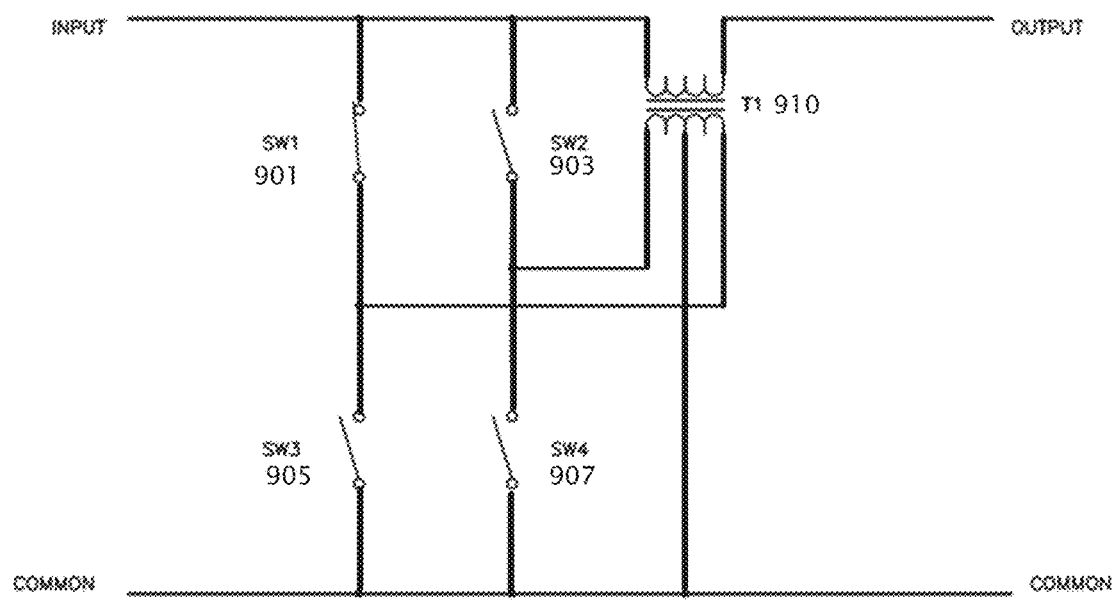

As seen in FIG. 10B when the controller 324 finds that the input voltage is higher than the tolerance, then it turns on SW1 (SW2, SW3 and SW4 are off). This action causes the output voltage to decrease by the amount equal to the secondary voltage of T1.

As seen in FIG. 10 D when the input voltage is within the tolerance then switches SW3 and SW4 (SW1 and SW2 are off) are turned on, In this case input voltage is equal to the output voltage.

Figure 10C:
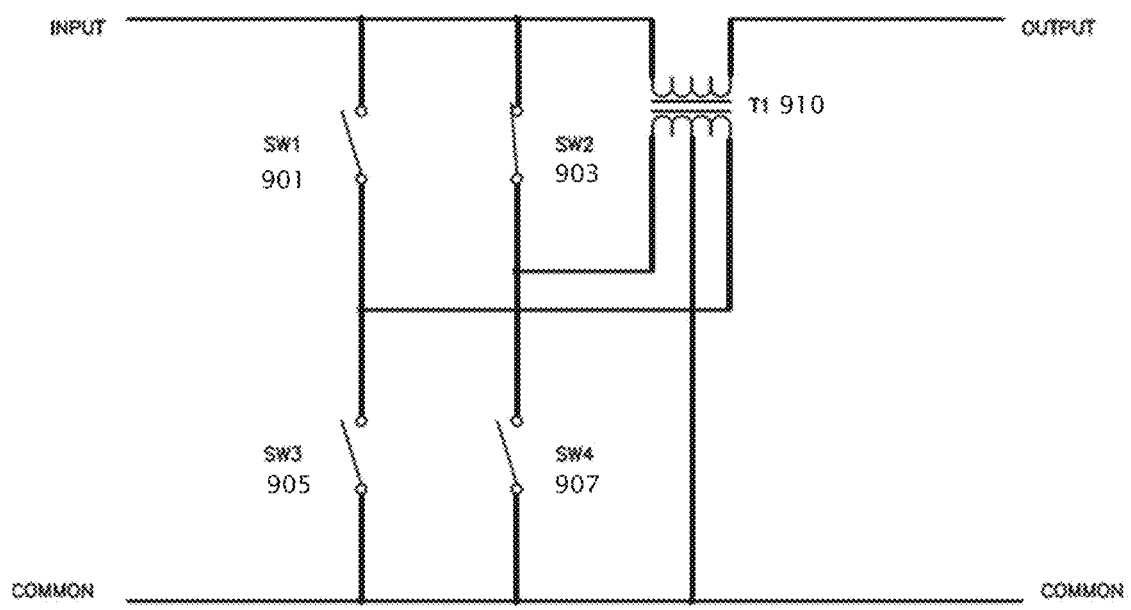
Figure 10D:
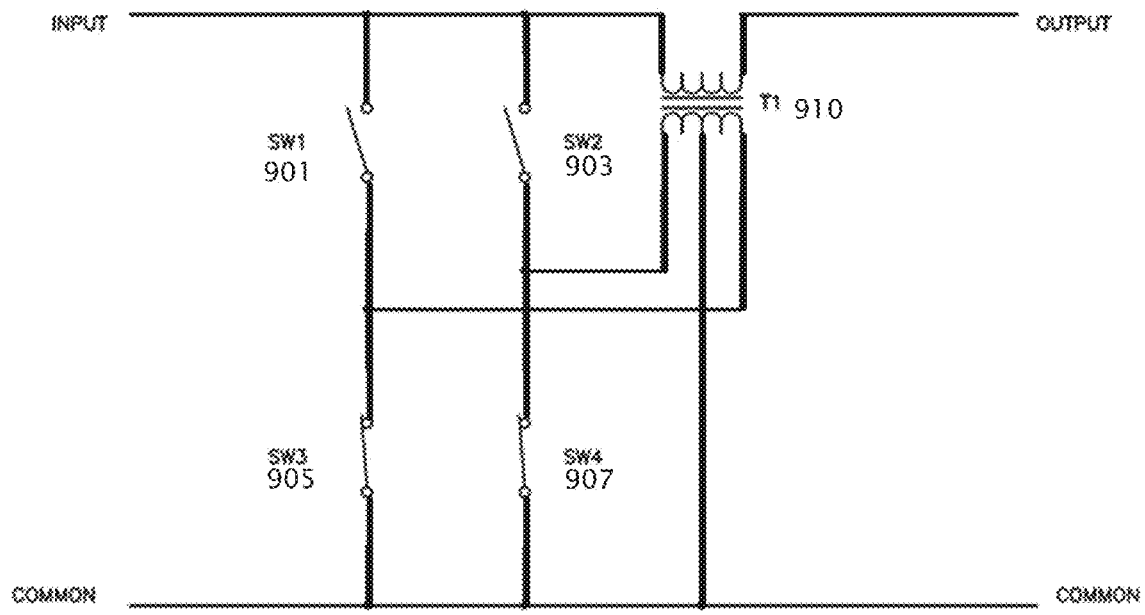

As shown in FIG. 10C when the controller finds that the input voltage is lower than the tolerance then it turs on only SW2 (SW1, SW3 and SW4 are off). This action causes the secondary voltage of T1 to be added to the input voltage.

In alternative examples several sets of this circuit 900 are connected in series. Each set reducing the its output voltage to a lower tolerance that can be corrected by the subsequent stage.

The second example of an electronic brushless variable transformer may also be configured as previously described to provide a variable AC voltage in two phase, three phase and the like AC power distribution circuits. In a further alternative example, the same principal is used in 2 or 3 phase circuits to accomplish required output voltage within tolerance in all phases.

The circuit 900 may be adjusted by configuring the switches in FIGS. 10A-10D to increase decrease or maintain a desired voltage. Under guidance of the controller 324 the circuit configurations may be set to obtain a desired output voltage in according to the following process.

Figure 11:
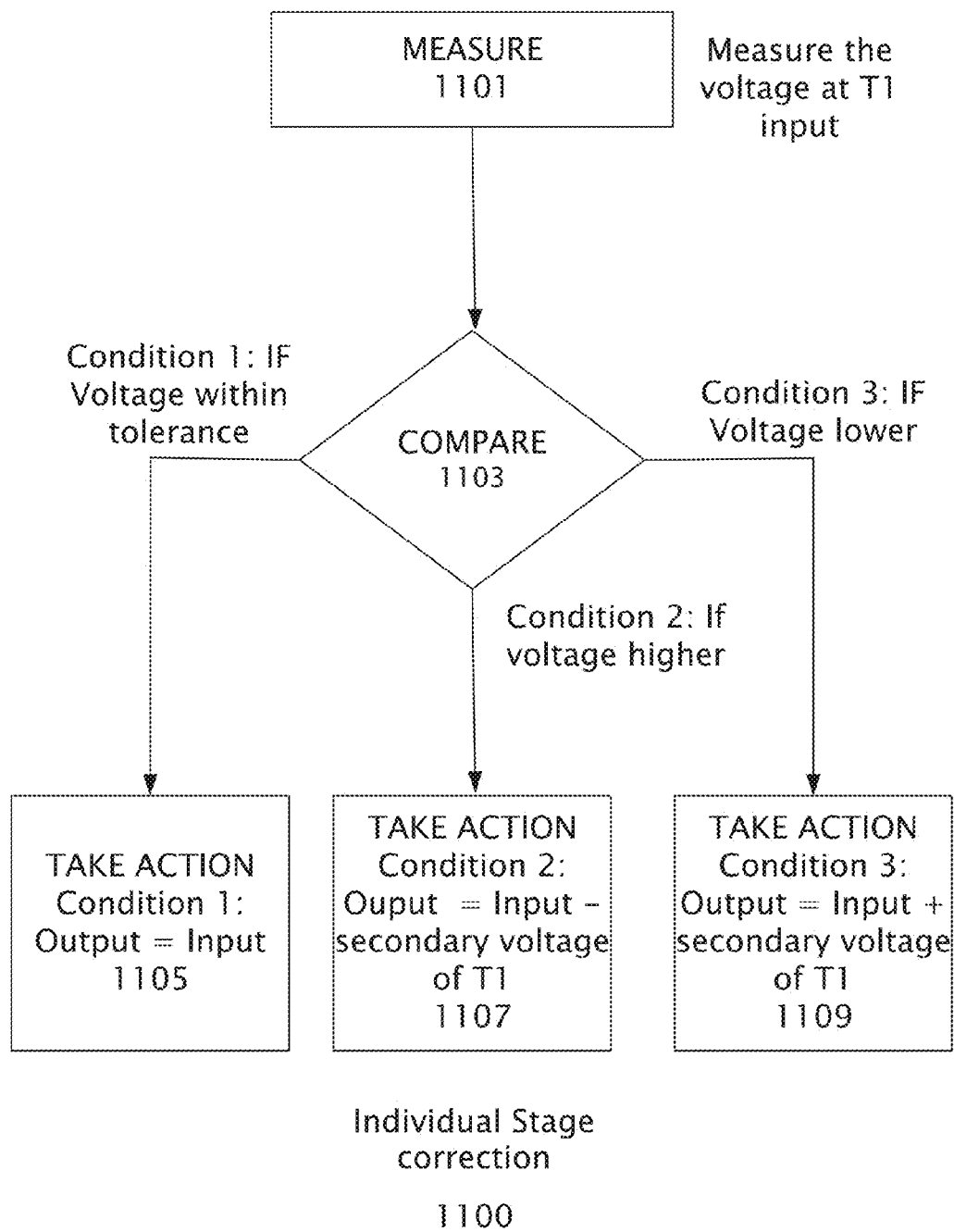
FIG. 11 is a process flow diagram illustrating a method of creating or setting a variable voltage output utilizing the electronic brushless variable transformers described herein.

FIG. 11 is a process flow diagram illustrating a method of creating a variable voltage output utilizing the electronic brushless variable transformers described herein 1100. At block 1101 the voltage at the input of transformer T1 (of FIGS. 9 and 10) is measured. At block 1103 a decision is made by comparison of the voltage to a predetermined level (the level may be adjusted or in alternative examples dynamically adjusted). If the voltage at T1 is within tolerance the circuit switches are set so that the output voltage is equal to the input voltage at block 1105. If the voltage measured at T1 is higher than the preset voltage level the switches are adjusted so that the circuit output is equal to the input voltage minus the secondary voltage of T1. And finally if the Voltage at the input of T1 is lower than the preset threshold then the switches are adjusted so that output is equal to the input plus the secondary voltage of T1. The process may be set to repeat as many times as desired to provide a desired level of voltage, or control of the voltage at the circuit output.

Figure 12:
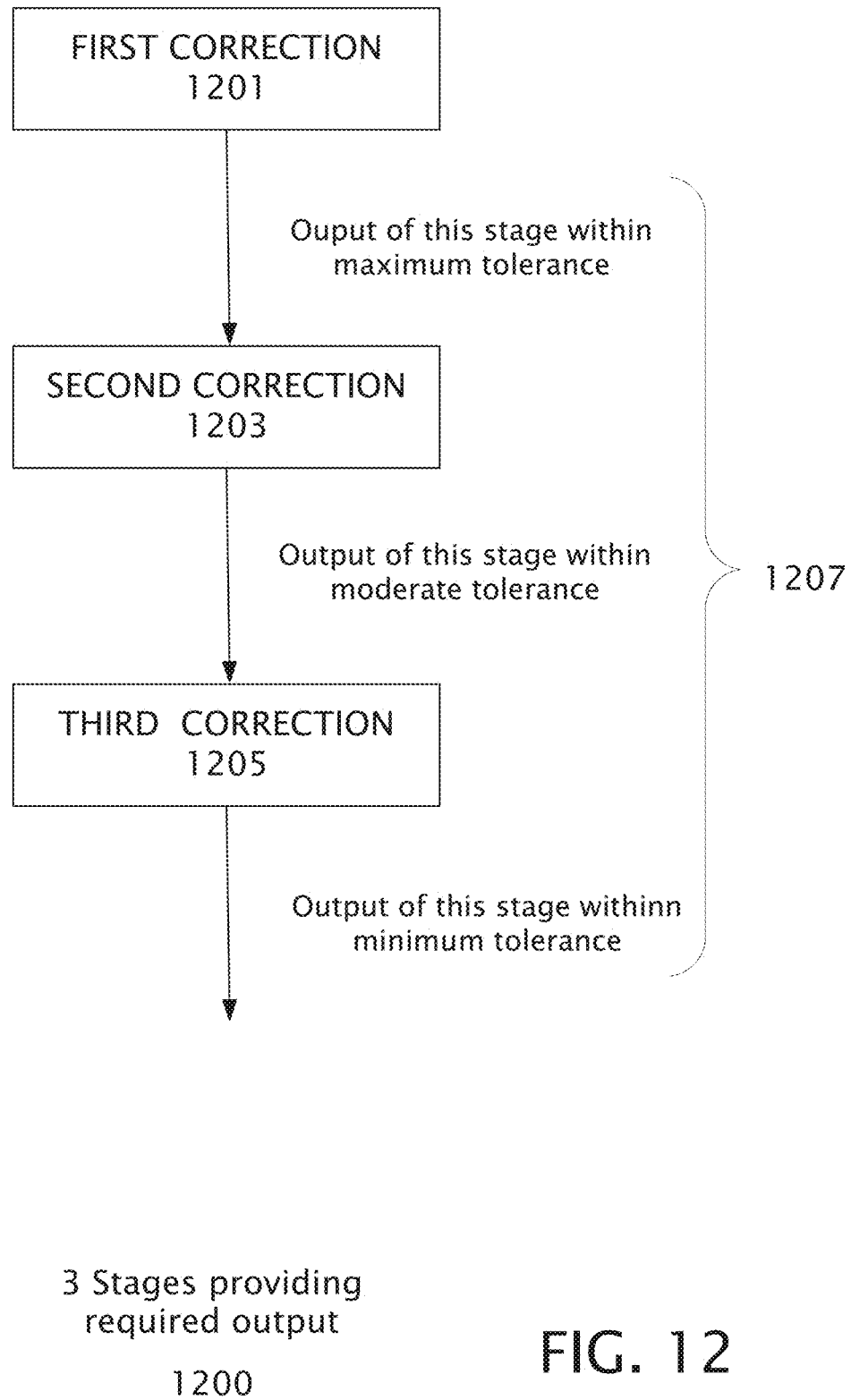
FIG. 12 shows the process for correcting the output of multiple cascaded circuits.

FIG. 12 shows the process for correcting the output of multiple cascaded circuits (900 of FIGS. 9 and 10) 1200. The corrections of FIG. 11 may be successively applied to progressively control the output voltage 1207. Here the first correction process 1201 provides voltage output of this stage that is within a maximum tolerance range. At block 1203 a second cascades circuit is controlled to provide a moderate range of tolerances. And finally at block 1205 a third stage is controlled to produce an output within the minimum tolerance level. A sued herein maximum, moderate, and minimum are used to denote a progression of control from coarse to fine that may be set at the discretion of a user. Also more or fewer circuits may be cascaded as desired to produce a desired level of output voltage control.

Figure 13:
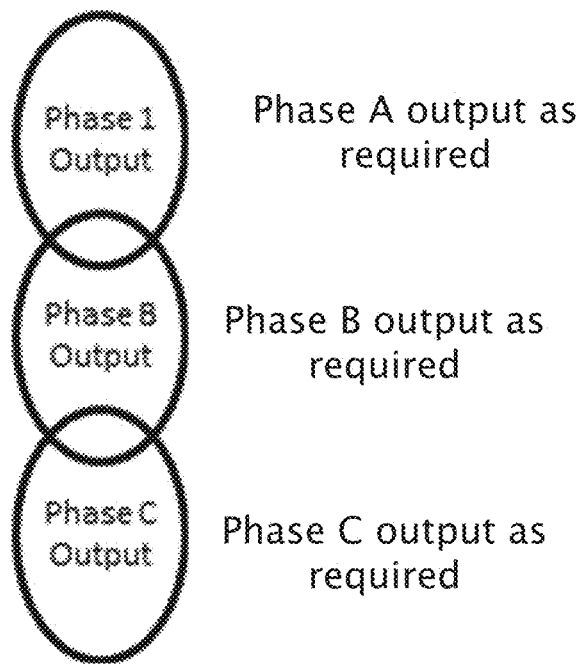
FIG. 13 illustrates generally the use of the circuit to control each of the phases in a three phase power system.

FIG. 13 illustrates generally the use of the circuit (900 of FIGS. 9 and 10) to control each of the phases in a three phase power system. Control of each phase may be achieved by single, or cascaded circuits to provide the desired control. Each circuit controls the output of its phase independently of the other circuits. The overall control for 1 and 2 phases is achieved using a single microcontroller or PLC (Programmable Logic Controller). For 3 phase units 2 or three microcontrollers/PLCs are used. They communicate with each other on communication lines (wired or wireless) so that overall objective is achieved. One of the microcontroller/PLC may be tasked with communicating with the outside world using the Ethernet port or equivalent.

Figure 14:
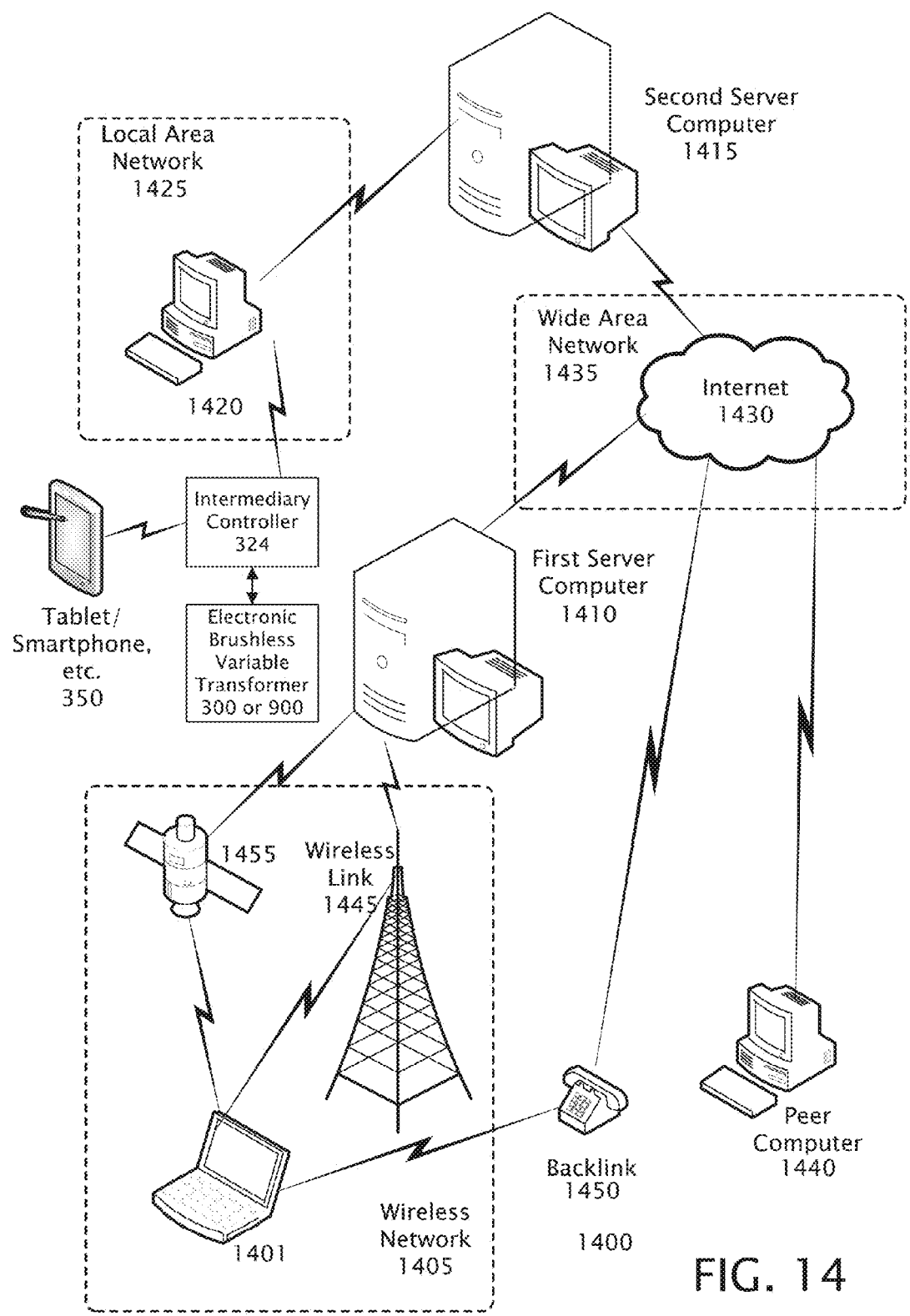
FIG. 14 is an exemplary network 100 in which the electronic brushless variable transformers described herein may be implemented.

FIG. 14 is an exemplary network 1400 in which the electronic brushless variable transformers described herein may be implemented. A direct link may be made to the intermediary controller 324 by a computing device such as a smart phone, tablet, laptop, PC, dedicated terminal or the like. Typically code for controlling the electronic brushless variable transformer components resides in the intermediary controller, with it providing an interface to a more conventional computing device (typically through an "APP" or "Application" located remotely and controlling it through a wired, wireless, or a combination of wired and wireless connections, of which examples are provided below.

Computer 1415 may be a server computer coupled to a user's computer 1420 through a conventionally constructed local area network 1425. The intermediary controller 324 that controls the electronic brushless variable transformers described herein may be interfaced with this computer in order to communicate (sending and receiving) in various ways with it by remotely located control devices 1401, 1450, 1440, 1415,120. The connections shown are exemplary and those skilled in the art will realize that a variety of wired and wired interfaces may be used to control the electronic brushless variable transformer.

In the local area network the user's computer is typically part of the local area network 1425 which may include a plurality conventional computers (not shown) and conventional peripheral equipment (not shown) coupled together utilizing topologies (token, star and the like) and switching equipment known to those skilled in the art. Those skilled in the art will realize that other processor equipped devices such as tablets, smartphones, cellular telephones, appliances and the like may be coupled to the internet utilizing conventional techniques known to those skilled in the art.

A typical local area network 1425 may include a conventionally constructed ISP network in which a number or plurality of subscribers utilize Wireless connections including cellular data, telephone dial up, DSL, cellular telephone, cable modem, or the like connections to couple their computer to one or more server computers 1415 that provide a connection to the world wide web 1435 via the internet 1430. Typically the intermediary controller 324 may be coupled to a computer in the network 1420. Which control the electronic brushless variable transformer 300 or 900, which interfaces with tablet or the like 350. Alternatively the tablet35 may communicate with the network at other connection points. For example the tablet 35 might be at a remote location and provide control of the circuit 300 or 900 through the facility of the various communication channels described in FIG. 14.

Wide area network, or world wide web 1435 is conventionally constructed and may include the internet 1430 or equivalent coupling methods for providing a wide area network. As shown a conventionally constructed first server computer 1410 is coupled to conventionally constructed second server computer 1415 through a conventionally constructed internet connection to the world wide web 1430.

In a peer to peer network a Peer computer 1440 is conventionally constructed to couple to the internet 1430 utilizing peer to peer network technology. Peer computer 1440 may couple to a plurality of similarly connected peer computers in a peer to peer network (not shown), or to other computers 1401, 1420 that are part of conventionally constructed networks 1425, 1435.

In a conventional wireless network 1405 a conventionally constructed tablet, smartphone, laptop, PC computer or the like 1401 is coupled to the internet 1430 via a conventionally constructed wireless link 1445. The wireless link may include cellular 1445, and satellite technology 1455 to provide the link. Such a wireless network may include a conventionally constructed first server computer 1410, typically provided to manage connections to a wide area network such as the internet.

A conventionally constructed back link may be provided to efficiently provide an additional channel to couple to the internet. For example in situations where communication is one way in nature, the back link may provide communications in the opposite direction. An example would be viewing a listing of system status or voltage outputs on a separate monitoring device and sending desired device settings via telephone 1440. Those skilled in the art will realize that back links may equivalently be provided by cellular telephones, cordless telephones, paging devices and the like.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A brushless variable transformer comprising;
   a first switch having a first terminal and a second terminal;
   a second switch having a first terminal and a second terminal;
   a third switch having a first terminal and a second terminal;
   a fourth switch having a first terminal and a second terminal; and
   a transformer having a primary winding having a first terminal, a second terminal and a tap located there between, and a secondary winding having a first terminal and a second terminal, in which the first terminal of the first switch is coupled to a first terminal of a second switch and the first terminal of the secondary winding of the transformer to form a circuit input, a second terminal of the first switch coupled to the first terminal of the third switch, and the second terminal of the primary winding of the transformer, a second terminal of the second switch coupled to a first terminal of the fourth switch, the tap of the transformer primary winding connected directly to the second terminal of the fourth switch and the second terminal of the third switch, and where the second terminal of the secondary winding of the transformer defines an output.

2. The brushless variable transformer of claim 1 further comprising a controller coupled to the first switch, the second switch, the third switch, and the fourth switch to adjust the first switch, the second switch, the third switch, and the fourth switch such that a desired output voltage is produced.

3. The brushless variable transformer of claim 1 further comprising a mobile device coupled to the controller to provide control of the brushless variable transformer.

4. The brushless variable transformer of claim 3 in which the mobile device is a tablet computer.

5. The brushless variable transformer of claim 3 in which the mobile device is a smart phone.

* * * * *